(12) United States Patent
Rangelow et al.

(10) Patent No.: US 8,312,561 B2
(45) Date of Patent: Nov. 13, 2012

(54) DEVICE AND METHOD FOR THE MICROMECHANICAL POSITIONING AND HANDLING OF AN OBJECT

(75) Inventors: Ivo W. Rangelow, Baunatal (DE);
Stefan Klett, Waltershausen (DE);
Eishad Guliyev, Ilmenau (DE); Tzvetan Ivanov, Ilmenau (DE); Burkhard Volland, Erfurt (DE)

(73) Assignee: Technische Universitaet Ilmenau, Ilmenau (DE)

( * ) Notice: Subject to any disclaimer, the term of this patent is extended or adjusted under 35 U.S.C. 154(b) by 654 days.

(21) Appl. No.: 12/524,936

(22) PCT Filed: Jan. 28, 2008

(86) PCT No.: PCT/EP2008/050963
§ 371 (c)(1),
(2), (4) Date: Jul. 29, 2009

(87) PCT Pub. No.: WO2008/092824
PCT Pub. Date: Aug. 7, 2008

(65) Prior Publication Data
US 2010/0017921 A1    Jan. 21, 2010

(30) Foreign Application Priority Data
Jan. 29, 2007    (DE) .................. 10 2007 005 293

(51) Int. Cl.
*G01Q 30/20* (2010.01)
(52) U.S. Cl. ............ 850/18; 820/1; 820/2; 820/3; 820/4
(58) Field of Classification Search ............... 850/1–4, 850/18; 73/105; 359/290, 224
See application file for complete search history.

(56) References Cited

U.S. PATENT DOCUMENTS

| | | | | | |
|---|---|---|---|---|---|
| 5,969,848 | A | * | 10/1999 | Lee et al. ...................... | 359/298 |
| 6,757,092 | B2 | * | 6/2004 | Abu-Ageel ................... | 359/290 |
| 6,806,991 | B1 | * | 10/2004 | Sarkar et al. .................. | 359/290 |
| 7,701,155 | B2 | * | 4/2010 | Tsuboi et al. ................. | 318/116 |
| 2005/0198844 | A1 | | 9/2005 | Lee et al. | |
| 2006/0112760 | A1 | * | 6/2006 | Hansma et al. ................ | 73/105 |

FOREIGN PATENT DOCUMENTS

| | | |
|---|---|---|
| DE | 42 14 220 X | 11/1993 |
| DE | 10 2005 051581 Y | 6/2006 |
| DE | 10 2004 063 296 Y | 7/2006 |
| EP | 0 838 302 XY | 6/2002 |
| WO | 97/21977 Y | 6/1997 |

* cited by examiner

*Primary Examiner* — Michael Maskell
(74) *Attorney, Agent, or Firm* — Lucas & Mercanti, LLP; Klaus P. Stoffel

(57) ABSTRACT

The invention relates to a device and a method for the micromechanical positioning and handling of an object. The aim of the invention is to provide a device and an associated method for the micromechanical positioning and handling of objects by means of which the scanning speed can be increased and the positional accuracy be improved so that real time images or video rate images (ca. 25 images per second) having a lateral and vertical resolution in the nanometer range can be achieved. According to the invention, a monolithic component, preferably made of silicon, comprises a support element, an object carrier, a plurality of guide elements and elements for transmitting the movement, the preferably piezoresistive drive elements and the preferably piezoresistive position detectors being integrated into said monolithic component; Said micromechanical positioning device can be used, for example, in scanning probe microscopy and in nanopositioning and nanomanipulation technology.

17 Claims, 9 Drawing Sheets

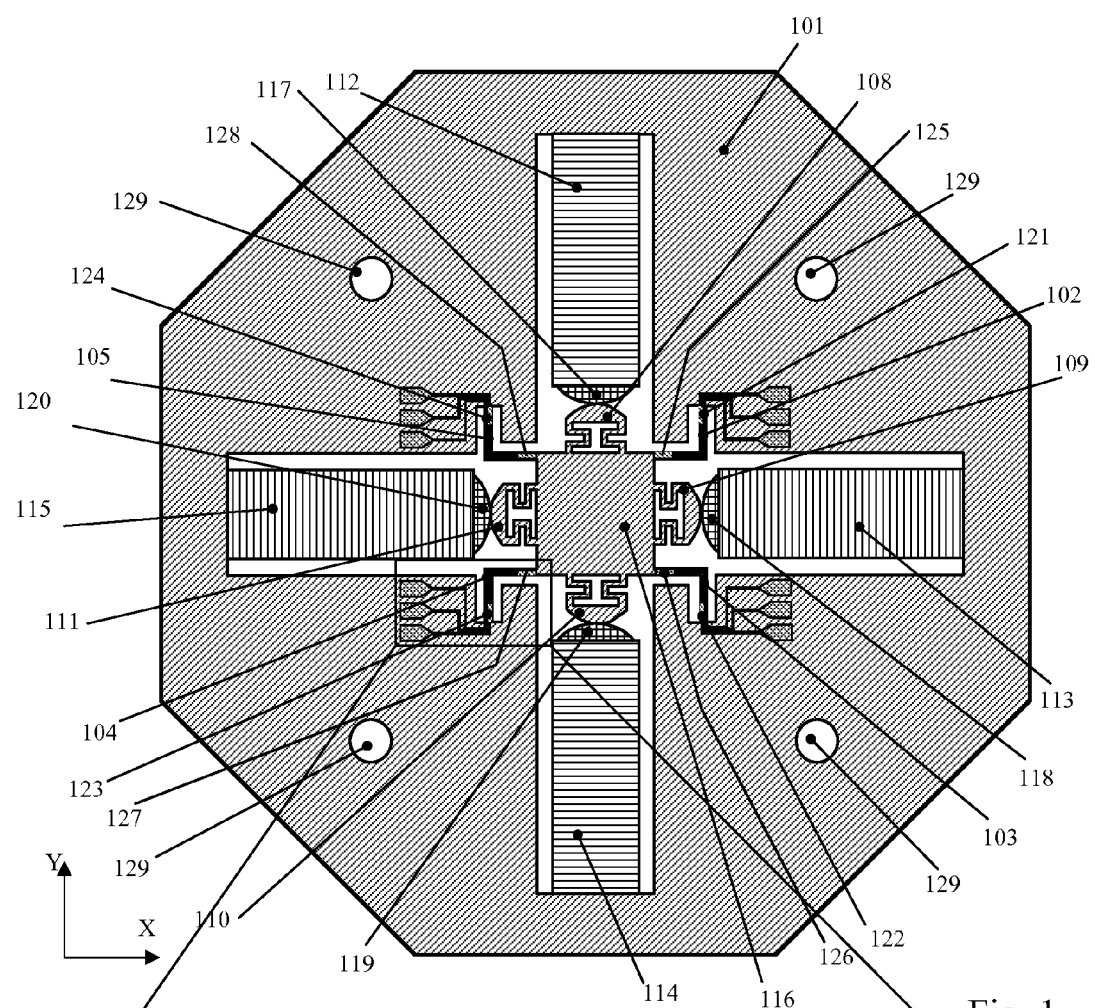
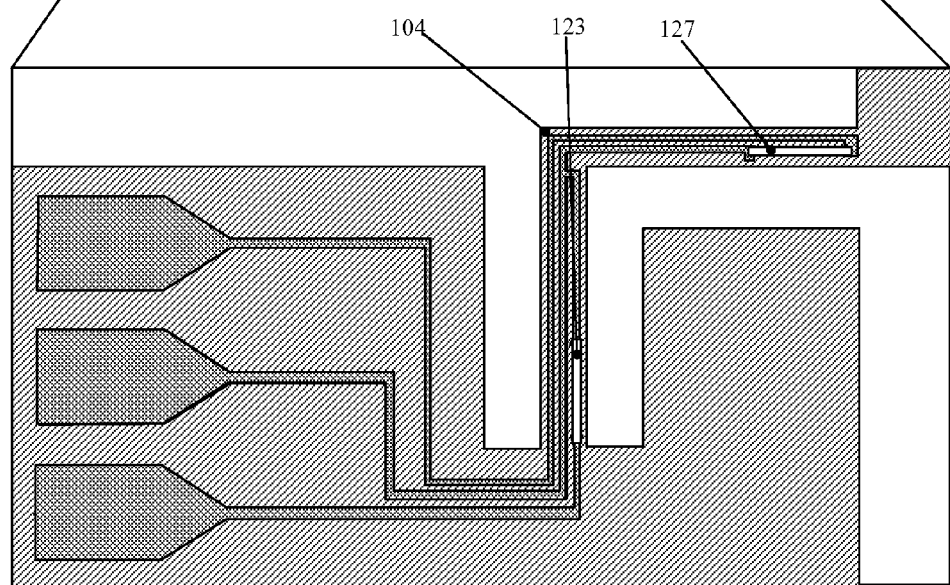
Fig. 1
Fig. 1a

DEVICE AND METHOD FOR THE MICROMECHANICAL POSITIONING AND HANDLING OF AN OBJECT

This application is a 371 of PCT/EP2008/050963 filed Jan. 28, 2008, which in turn claims the priority of DE 10 2007 005 293.8 filed Jan. 29, 2007, the priority of both applications is hereby claimed and both applications are incorporated by reference herein.

BACKGROUND OF THE INVENTION

The present invention pertains to a device and to a method for the micromechanical positioning and manipulation of an object with preferably piezoelectric actuators.

Micromechanical positioning devices are used in various areas. The most important areas of application are scanning probe microscopy and nanopositioning and nanomanipulation. Scanning probe microscopes are powerful tools used for the study of the surface properties of different types of materials, for example, also for the determination of molecular and atomic interactions on surfaces, and for the imaging of individual biological molecules. Nevertheless, commercial scanning probe microscopes are very large because of their positioning and position-control mechanisms, and this in turn limits the scanning speed and the scanning area as well as the areas of application of these types of microscopes. The drive mechanisms used in these microscopes, furthermore, do not allow higher dynamics.

A new positioning device is known from US 2006/0112760. This device has a higher scanning speed, but, because of its geometric dimensions and metallic design, it is usable to only a limited extent for real-time imaging (video rate imaging (at about 25 frames/s) with lateral and vertical resolutions in the nanometer range).

Electrostatically or thermally driven micromechanical positioning systems, furthermore, are known from U.S. Pat. No. 6,806,991 B1, by means of which, in spite of much smaller dimensions and masses, it is still impossible to realize higher scanning speeds.

In the case of scanning probe microscopy, the position controls are often realized by optical methods (e.g., interferometry).

SUMMARY OF THE INVENTION

The goal of the present invention is therefore to overcome the disadvantages known from the prior art and to provide a device and an associated method for the micromechanical positioning and manipulation of objects by means of which the scanning speed can be increased and the positioning accuracy can be improved, so that real-time images or video rate imaging (about 25 frames/s) with lateral and vertical resolution in the nanometer range can be realized.

According to the invention, this goal is achieved with the device for micromechanical positioning and manipulation of an object, comprising: at least one support element, an object carrier, guide elements, drive elements, elements for transmitting the movement from a drive element to the object carrier, and position detectors, where a contact point between the movement-transmitting elements and associated drive elements is formed as an arc, a ball, or a pointed tip, wherein the support element, the object carrier, the guide elements, and the movement-transmitting elements are a monolithic component.

Additional details and advantages of the invention can be derived from the following descriptive section, in which the invention is explained in greater detail with reference to the attached drawings, in which the same or similar parts are designated in all of the figures by the same reference numbers:

BRIEF DESCRIPTION OF THE DRAWINGS

FIG. 1 shows a first exemplary embodiment of an inventive device for the micromechanical positioning and manipulation of an object;

FIG. 1a shows an enlarged diagram of the guide elements of the device shown in FIG. 1 with integrated position detectors;

DETAILED DESCRIPTION OF THE INVENTION

Figure 2:
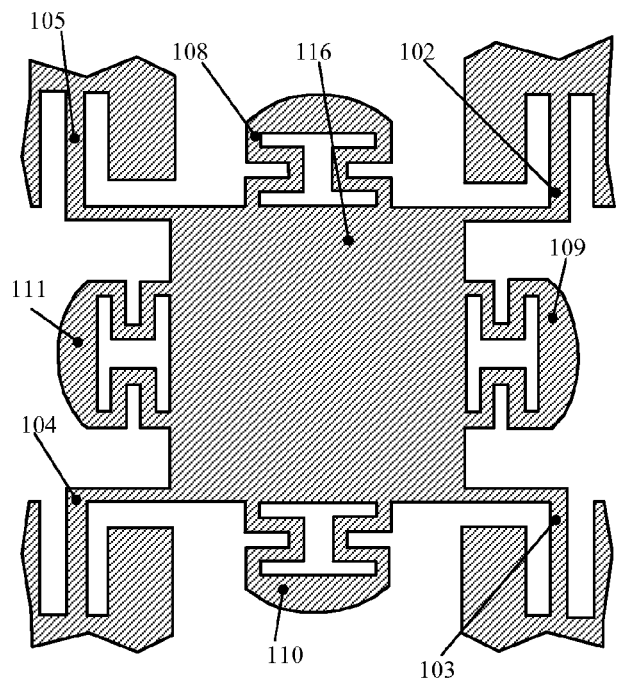
FIG. 2 shows an enlarged diagram of the exemplary embodiment of FIG. 1.

FIGS. 1 and 1a show an exemplary embodiment of the inventive device and an enlarged part thereof. According to the invention, the support element 101, the object carrier 116, the guide elements 102-105, and the elements 108-111 for transmitting the movement from the drive elements to the object carrier represent a monolithic component, preferably of silicon with a crystal orientation of <111> or <100>. On the basis of the semiconductor technologies known from the prior art, therefore, the inventive device can be miniaturized, and its weight can be reduced simultaneously. In addition, monocrystalline silicon, which is characterized by high rigidity and low mass density, has a high resonance frequency, as a result of which, a high limit frequency can be achieved with the inventive positioning device during the scanning or positioning process.

The object carrier 116 is connected by guide elements 102-105 to the one-piece support element 101, wherein the guide elements can comprise a wide variety of different shapes (e.g., L-shaped).

The position detector or detectors 121-128, which is/are preferably piezoresistive position sensors, is/are integrated into at least one guide element 102-105. They serve as deflection sensors for the corresponding directions of movement. A field-effect transistor can also be used as a position detector. The channel serves here as a piezoresistive detection element. When silicon is used as a construction material for the inventive device, the necessary control electronics can be integrated into the support element, for example.

In an advantageous embodiment of the inventive device, position detectors are arranged on all of the guide elements. Simultaneous multiple evaluation of the position of the object carrier is thus possible.

To compensate for environmental influences such as temperature fluctuations, the position detectors (piezoresistive position sensors) are, in another preferred embodiment, connected to form a bridge circuit, wherein additional necessary elements of this bridge can be integrated into the nonmoving parts of the inventive device (e.g., the support element).

The drive elements 112-115 are integrated into the support element 101. The movement generated by the drive elements is transmitted to the object carrier 116 in each case by way of point contacts or ball-shaped contact points 117-120 and by way of the movement-transmitting elements 108-111. As a result of the point-like or ball-like contact points on the drive elements, it is possible to avoid any type of tipping forces.

According to the invention, piezoelectric actuators are preferably used as drive elements. Piezoelectric actuators are characterized by their rapid reaction to changes in voltage. Nevertheless, the object carrier 116, because of its inertia, reacts much more slowly to a change in position determined by the piezoelectric actuators. To compensate for the reaction forces of the object carrier which occur at high accelerations, the drive elements (piezoelectric actuators) for one direction of movement operate according to the invention on the basis of the push-pull principle. The use of this principle also avoids any problems with overswing.

With a suitable arrangement of several drive elements, movements in the x-y plane as well as tipping, rotation, parallelism deviations, and elevations in the z direction can be detected and thus corrected, and they can also be produced intentionally.

Of course, it also lies within the scope of the invention to use other types of actuators such as piezoelectric bimorph actuators, electromagnetic or electrostatic actuators, or even bimetal actuators.

FIG. 2 shows an embodiment of the monolithic component described above comprising the object carrier 116, the L-shaped guide elements 102-105, and the elements 108-111 for transmitting the movement from the drive elements to the object carrier. In this embodiment, the drive and guide elements and the elements for transmitting the movement are positioned with mirror-image symmetry around the object carrier.

Figure 3:
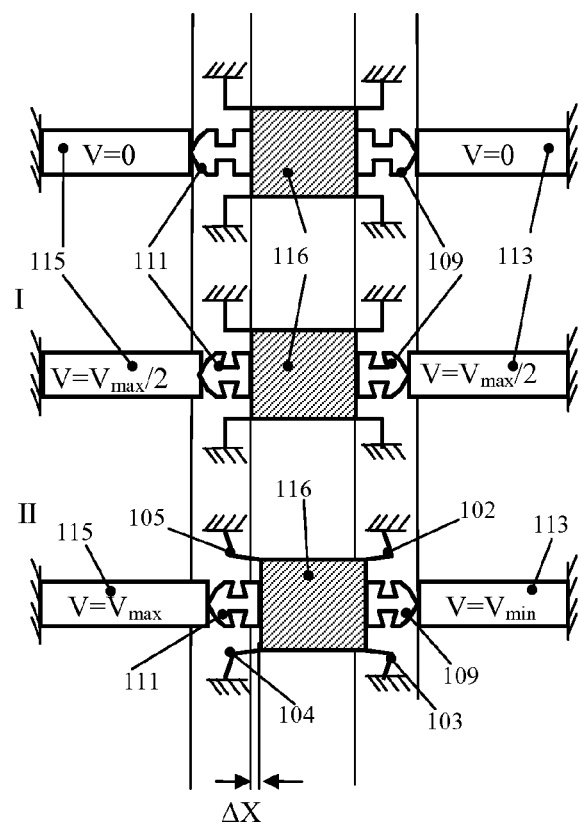
FIG. 3 shows an illustration of a displacement of the object carrier in the x direction by the push-pull principle.

FIG. 3 shows the inventive method for movement of the object carrier 116 in the x direction by way of example. The symbol "V" stands for the voltage applied to the actuator, the voltage being proportional to the deflection. In a first step, the zero position is set up. For this purpose, the drive elements (piezoelectric actuators) 113, 115 are extended to one-half of their adjusting distances. This is necessary for the realization of the push-pull principle. The object carrier 116 does not change its position, because the action of the piezoelectric actuators 113, 115 via the elements 109, 111 for transmitting the movement compensate for each other. This position of the object carrier is detected as the zero position by the position detectors mounted on the guide elements 102-105.

In the following step, the piezoelectric actuator 115 is extended and the piezoelectric actuator 113 located in the same direction of movement is retracted. As a result, the object carrier 116 is pushed in the x direction in correspondence with the extension of the piezoelectric actuator 115, and the side pieces of the L-shaped guide elements 102-105 perpendicular to this direction of movement are bent. This brings about a change, proportional to the degree of extension, in the electrical resistance of the piezoresistive position sensors, which, according to the invention, are integrated into the guide elements 102-105. When one position detector is used on each guide element, the displacement of the object carrier 116 can be determined from the difference of the change in resistance, and positional deviations, e.g., tipping, rotation, or parallelism deviations, can be recognized simultaneously and corrected if desired.

Figure 4:
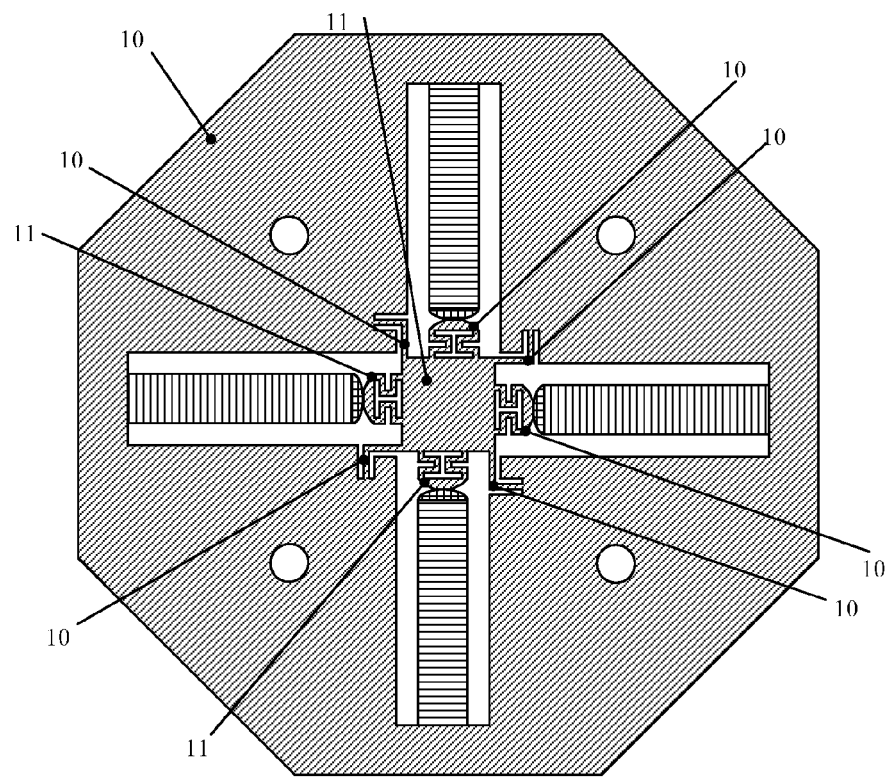
FIG. 4 shows a second exemplary embodiment of the inventive device.

FIG. 4 shows a second embodiment of the inventive device. Here the drive and guide elements and the movement-transmitting elements are positioned in a rotationally symmetric manner around the object carrier.

Figure 5:
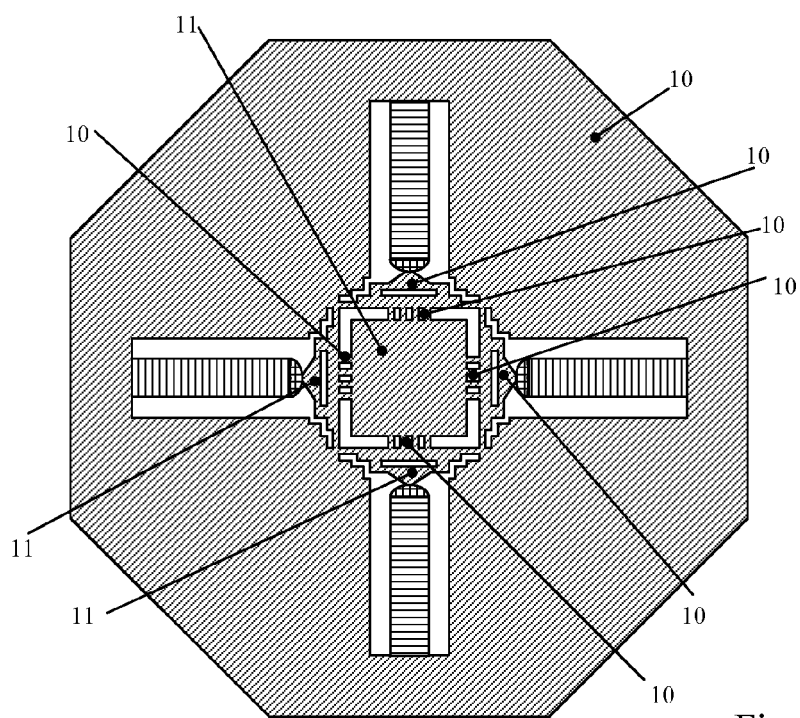
FIG. 5 shows a third exemplary embodiment of the inventive device.

FIG. 5 shows a third embodiment of the inventive device, in which the guide elements 102-105 are combined with the movement-transmitting elements 108-111. Through this combination, the introduction of parasitic forces transverse to the direction of movement of the drive elements is avoided when the object carrier 116 moves in a direction orthogonal thereto.

Figure 6:
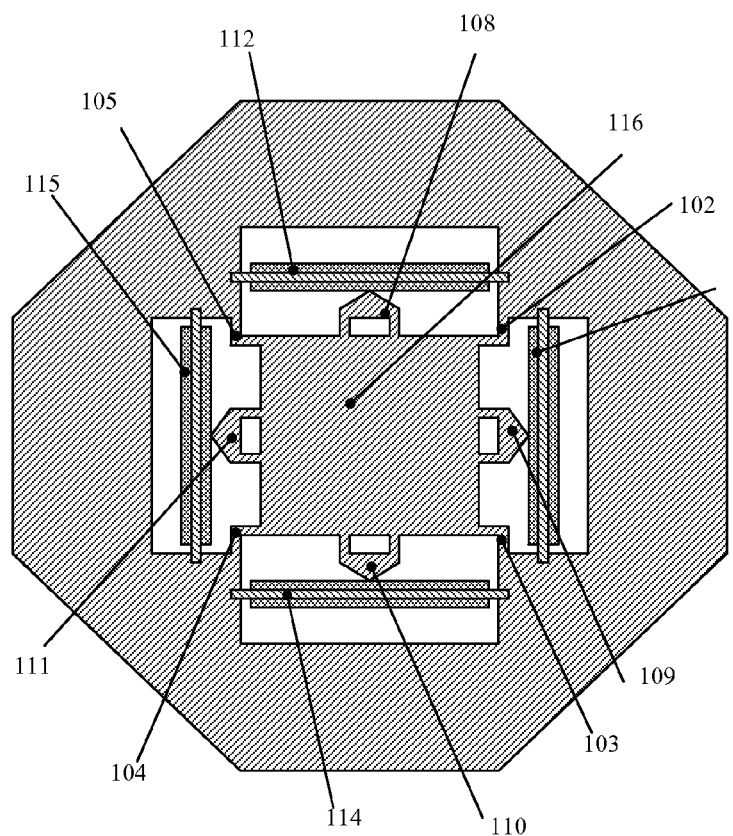
FIG. 6 shows a fourth exemplary embodiment of the inventive device.

FIG. 6 shows a fourth embodiment of the inventive device, in which bimorph actuators, e.g., bimorph piezoelectric actuators, are used as drive elements. As a result, the dimensions of the overall design can be considerably reduced.

Figure 7:
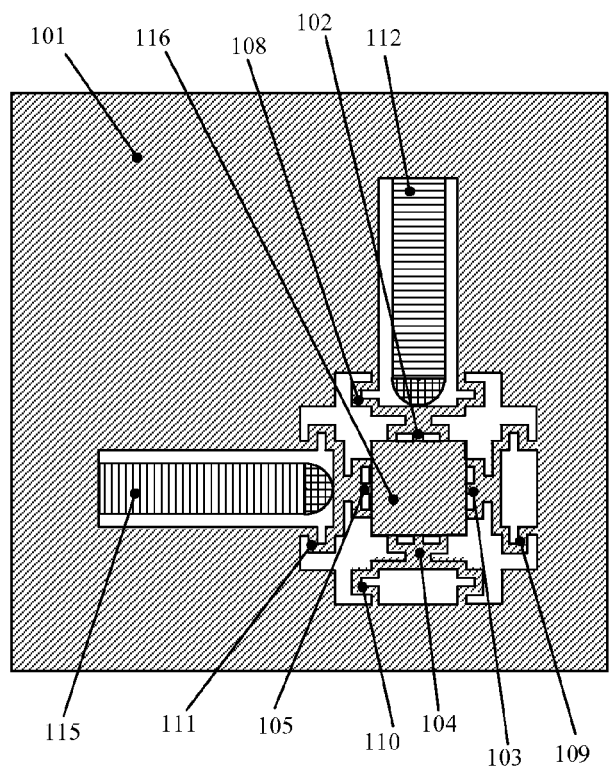
FIG. 7 shows a fifth exemplary embodiment of the inventive device.

FIG. 7 shows a fifth embodiment of the inventive device, in which only two drive elements are used, these being arranged asymmetrically. This embodiment does not work on the push-pull principle; instead, the restoring forces are generated by the guide elements 104, 103. As a result, in comparison with the previously described embodiments, the number of required drive elements and associated control elements is reduced.

Figure 8:
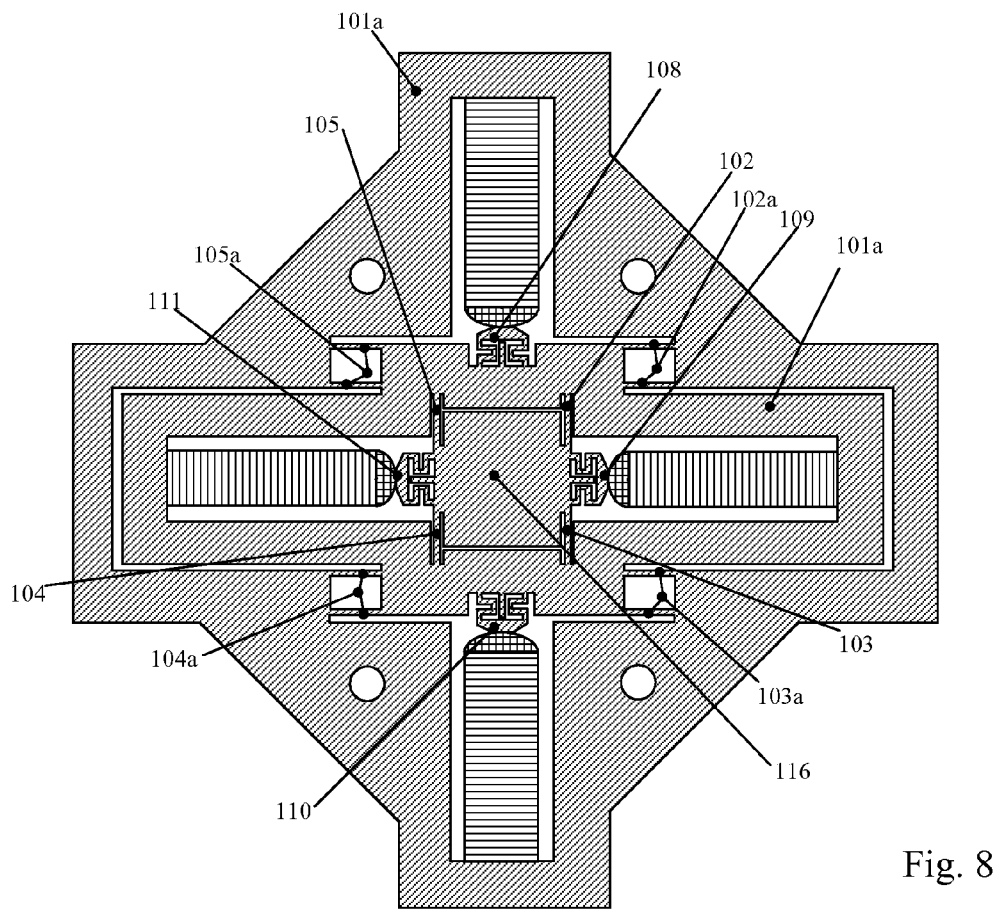
FIG. 8 shows a sixth exemplary embodiment of the inventive device.

FIG. 8 shows an exemplary embodiment of the inventive positioning device in which the support element 101a is designed as a two-part unit, one part nested inside the other. The inner part of the support element, which carries the drive elements for one direction (e.g., the x direction) and the guide elements 102-105 and is moved by the drive elements in the direction perpendicular to that (y direction). The position detectors for the first direction of movement (x direction) are integrated into the guide elements 102-105. The drive elements for the second direction of movement (y direction) are integrated into the outer part of the support element 101a. The position detectors for the second direction of movement (y direction) are integrated into the guide elements 102a-105a.

Figure 9:
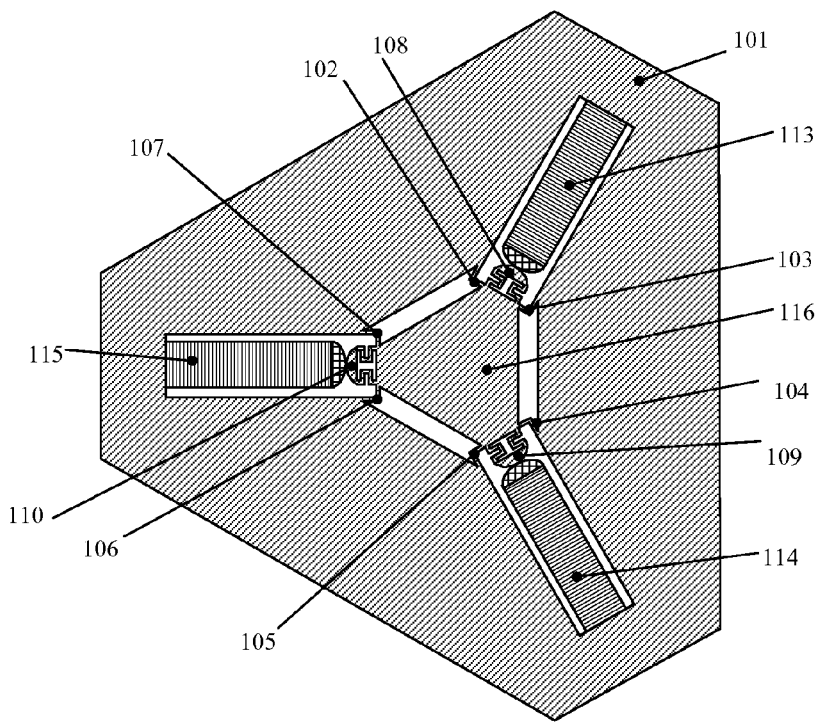
FIG. 9 shows a seventh exemplary embodiment of the inventive device.

FIG. 9 shows an exemplary embodiment with 120° rotational symmetry. With this embodiment of the inventive device, it is possible to execute not only linear movements in the x and y directions but also partial rotational movements in a predetermined manner.

Figure 10:
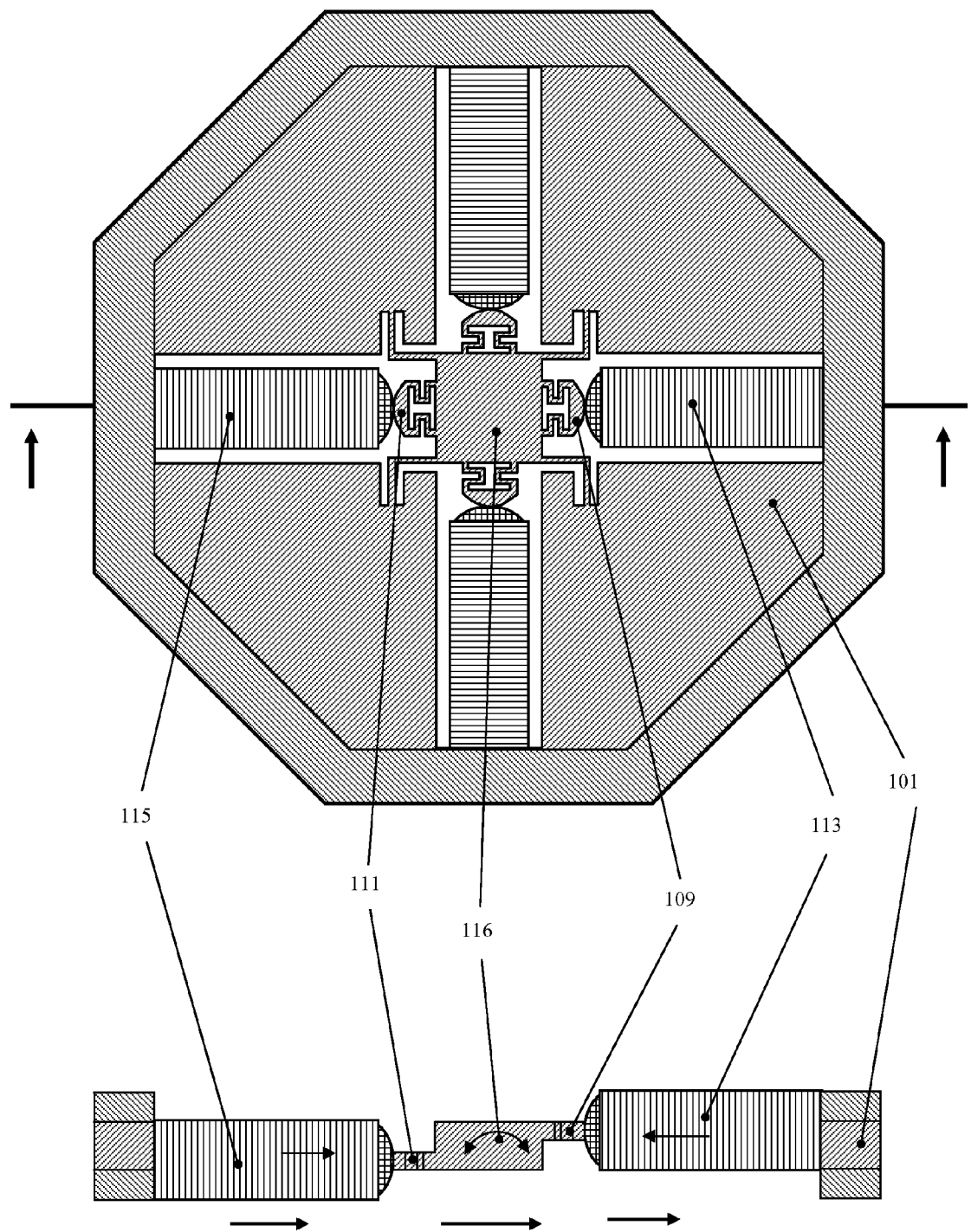
FIG. 10 shows an eighth exemplary embodiment of the inventive device.

FIG. 10 shows an embodiment in which, in addition to the movements in the plane (x and y directions), tipping movements can also be executed in a targeted manner. For this purpose, the force is introduced by a first drive element 113 below the center of gravity of the object carrier 116 and by a second, opposite drive element above the center of gravity. When both drive elements are extended or both are retracted, the object carrier tips. When one of the drive elements is extended and the opposite drive element is retracted (push-pull principle), a movement in the plane of the object carrier 116 occurs. It is also possible to superimpose these two movements.

Figure 11:
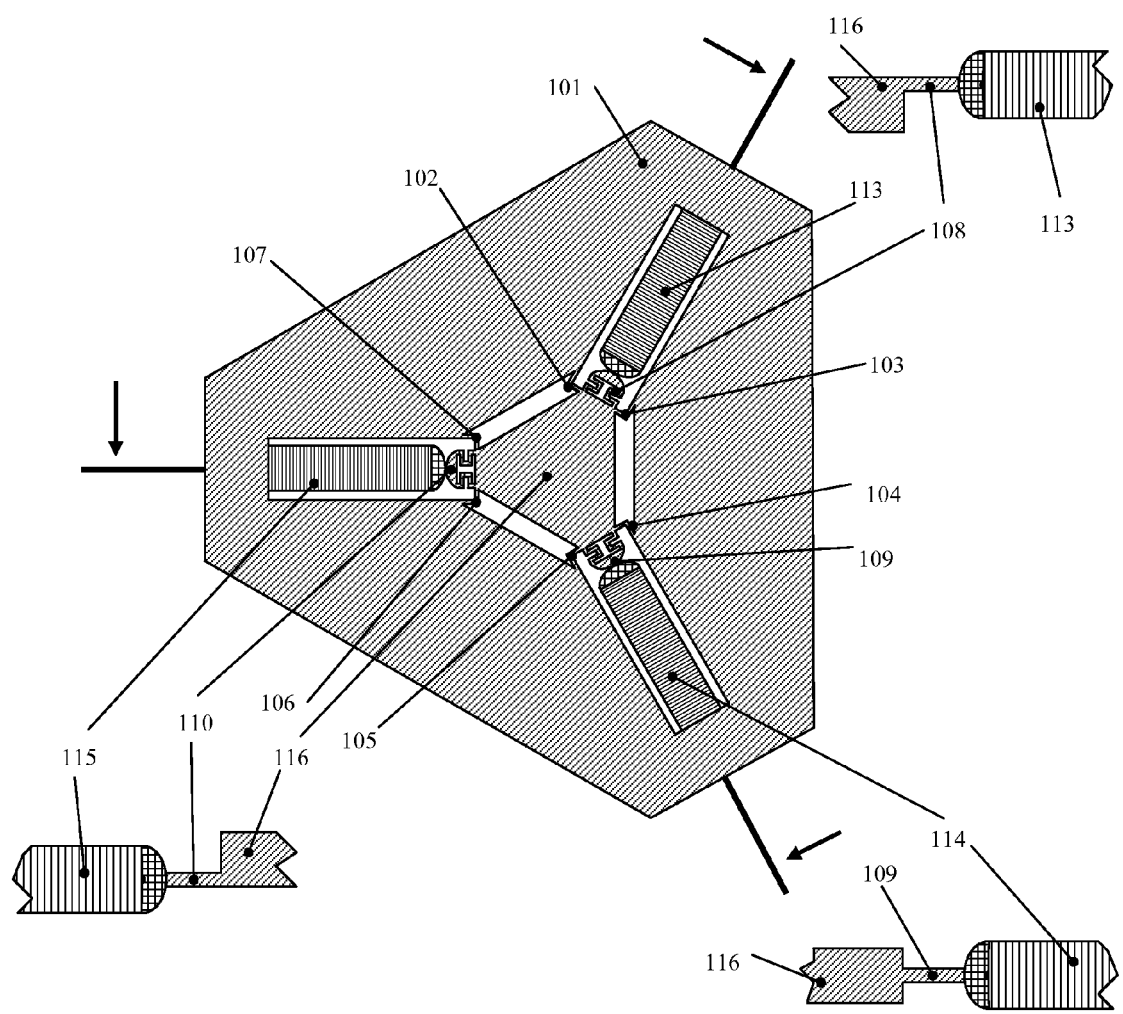
FIG. 11 shows a ninth exemplary embodiment of the inventive device.

FIG. 11 shows another embodiment of the inventive device, which is suitable for generating movements in a plane, partial rotations, and tipping movements. The movements in a plane and the rotational movements are realized in a manner similar to that of the embodiment shown in FIG. 9.

To generate tipping movements, the force is introduced on three different levels by the three drive elements.

Figure 12:
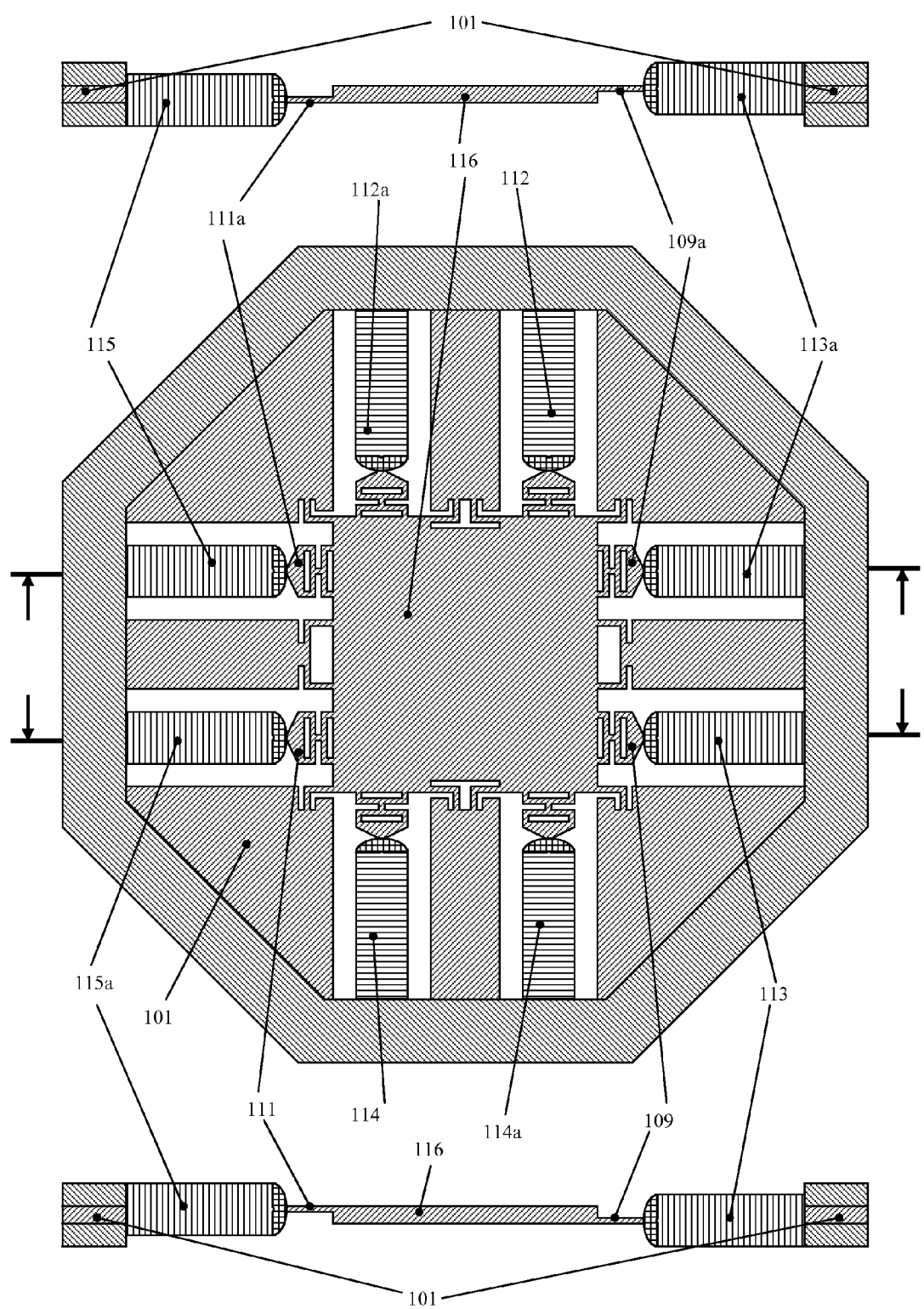
FIG. 12 shows a tenth exemplary embodiment of the inventive device.

FIG. 12 shows an embodiment of the invention for generating movements in a plane, partial rotations, and tipping movements. The movements in a plane are generated according to the principle of the embodiment shown in FIG. 1, wherein the actuators 112 and 112a, 113 and 113a, 114 and 114a, 115 and 115a operate on the in-phase principle. To generate a rotation, the actuators 112, 113, 114, 115 are extended, and the actuators 112a, 113a, 114a and 115a are retracted. Rotation in the opposite direction is generated in the inverse manner. To generate a tipping movement, the actuators 113 and 115a, for example, are retracted, and the actuators 113a and 115 are extended. Other tipping movements are generated in a similar manner.

Figure 13:
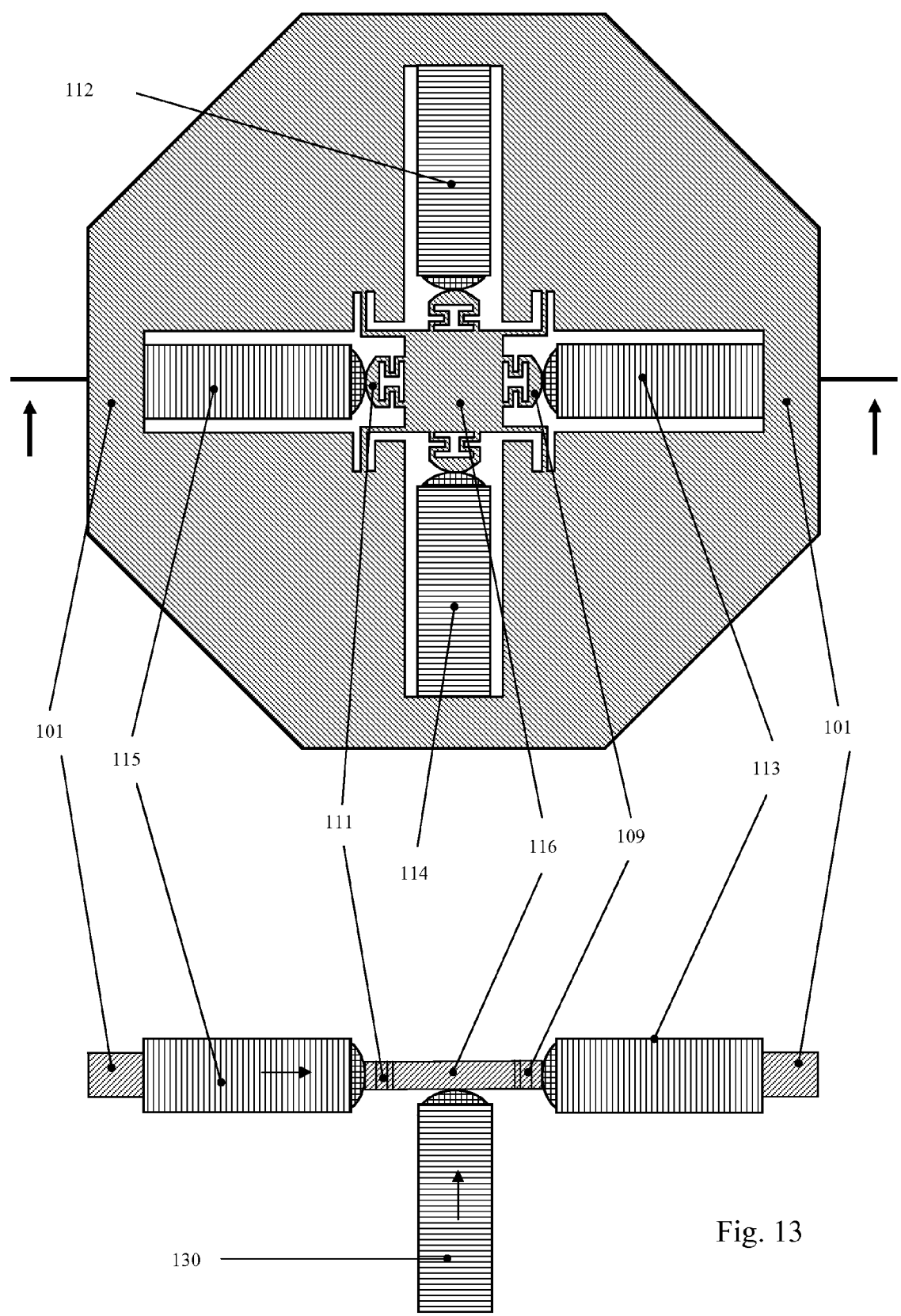
FIG. 13 shows an eleventh exemplary embodiment of the inventive device.

FIG. 13 shows by way of example an embodiment of the invention in which, in addition to the actuators 112-115 for generating the lateral, tipping, and partial rotational movements, one or more actuators 130 are installed underneath the object carrier 116 to generate elevations of the object carrier 116 along the z axis. The actuator or actuators 130 for generating elevations in the z direction can also be provided in any of the other embodiments of the invention according to FIGS. 1-12.

In a previously described preferred embodiment, position detectors are mounted on all of the guide elements to detect both movements in the x-y plane and rotations and tipping movements, so that, with the exemplary embodiments shown in FIGS. 10-13, these movements can be detected, monitored, and realized in a predetermined manner.

According to the invention, the entire device is produced as a single unit on a silicon wafer by means of traditional surface/volume micromechanical technology (surface micromachining or bulk micromachining). CMOS semiconductor fabrication technology, which has been continuously perfected over its many years of existence, makes it possible to fabricate the inventive micromechanical device for the positioning and manipulation of an object with minimal effort.

The inventive combination of the micromechanical design with suitable drive elements (piezoelectric actuators) and suitable position detectors (piezoresistive position sensors) makes it possible to integrate these elements into the monolithic component. This improves the accuracy with which the position of the object carrier can be determined, because the piezoresistive resistors can be positioned precisely where the actual movement of the object carrier can be detected most effectively.

The inventive positioning device achieves an increase in the scanning speed, and in association with that, it also opens up new areas of application (e.g., for real-time AFM or video rate imaging). It can be used under vacuum or in the atmosphere and is also suitable for use in liquids and in dusty environments. It is also resistant to many laboratory chemicals.

LIST OF REFERENCE NUMBERS 101 support element
101a two-piece support element
102-107 guide elements
102a-105a guide elements
108-111 elements for transmitting movement from the drive element to the object carrier
112-115 drive elements
112a-115a drive elements
116 object carrier
117-120 contact points
121-128 position detectors
129 fastening and mounting holes
130 drive element/actuator

The invention claimed is:

1. A device for micromechanical positioning and manipulation of an object, comprising:
at least one support element,
an object carrier,
guide elements,
drive elements,
elements for transmitting movement from one of the drive elements to the object carrier; and
position detectors,
where a contact point between the movement-transmitting elements and associated drive elements is formed as an arc, a ball, or a pointed tip, wherein the support element, the object carrier, the guide elements, and the movement-transmitting elements are a monolithic component made of silicon, wherein the position detectors are piezoresistive position sensors, wherein the drive elements and the piezoresistive position detectors are integrated into the monolithic component, and wherein at least one of the piezoresistive position detectors is arranged in at least one of the guide elements.

2. The device according to claim 1, wherein the object carrier is connected to the support element by the guide elements, the movement-transmitting elements being formed on the object carrier.

3. The device according to claim 1, wherein the guide elements are flexible in two lateral directions and/or the movement-transmitting elements are flexible within a predefined range in their direction of movement.

4. The device according to claim 1, wherein at least one of the movement-transmitting elements is assigned to each drive element.

5. The device according to claim 1, wherein the drive elements are piezoelectric actuators, piezoelectric bimorph actuators, electromagnetic or electrostatic actuators, bimetal actuators, or multilayer actuators.

6. The device according to claim 1, wherein four drive elements, four guide elements, and four movement-transmitting elements are positioned with mirror-image or rotational symmetry around the object carrier.

7. The device according to claim 1, wherein eight drive elements, twelve guide elements, and eight movement-transmitting elements are arranged with mirror-image symmetry around the object carrier.

8. The device according to claim 1, wherein two drive elements, four guide elements, and four movement-transmitting elements are arranged in an asymmetric arrangement.

9. The device according to claim 1, wherein the movement-transmitting elements are combined with the guide elements.

10. The device according to claim 1, wherein two of the position detectors are integrated into each of the guide elements.

11. The device according to claim 1, wherein the position detectors are arranged in a bridge circuit.

12. The device according to claim 1, wherein the guide elements are flexible in all directions (displacement, rotation, and tipping), and the piezoresistive position detectors are suitably arranged for detection and compensation of tipping, rotation, and parallelism deviations or elevations in a z direction of the object carrier.

13. The device according to claim 1, wherein the support element is a two-part nested unit, wherein a first, inner part of the support element comprises the object carrier, the drive elements for a first direction of movement, the movement-transmitting elements, and the guide elements, and a second, outer part of the support element comprises the drive elements for a second direction of movement, which move the first part of the support element with its elements.

14. The device according to claim 1, wherein at least three drive elements and three movement-transmitting elements are arranged with rotational symmetry in a manner suitable for generating movements in a plane (x, y direction) and rotational movements.

15. The device according to claim 1, wherein at least one of the drive movement-transmitting elements is arranged so as to generate z-elevation movements of the object carrier.

16. A method for micromechanical positioning and manipulation of an object with a device having at least one support element, an object carrier, guide elements, drive elements, elements for transmitting movement from a drive element to the object carrier, and position detectors, wherein the drive elements for one direction of movement operate on a push-pull principle, the method comprising the steps of:

setting starting position (zero position), in which the drive elements are extended by half of their adjusting distance;

recording the zero position with the position detectors;

displacing, rotating, or tipping the object carrier in one direction of movement, rotation, or tipping by a suitable combination of extension and/or retraction of the associated drive element or drive elements in the associated direction of movement, rotation, or tipping, wherein the guide elements perpendicular to this direction of movement, rotation, or tipping are bent, and a change in position of the object carrier is detected by the associated position detectors; and evaluating the detected change in position by the difference method and correcting the position of the object carrier by targeted actuation of the drive elements.

17. The method according to claim 16, including introducing forces to the object carrier by the drive elements at different heights.

* * * * *